United States Patent
Brown et al.

(10) Patent No.: US 7,765,566 B2
(45) Date of Patent: Jul. 27, 2010

(54) IN-BAND SIGNALING TO CONTROL ENCRYPTION AND TRANSCODING RESOURCES IN VOD/ON-DEMAND SYSTEM

(75) Inventors: Christopher W. Brown, Horsham, PA (US); Arthur P. Jost, Mount Laurel, NJ (US); Robert Edward Mack, Collegeville, PA (US)

(73) Assignee: General Instrument Corporation, Horsham, PA (US)

( * ) Notice: Subject to any disclaimer, the term of this patent is extended or adjusted under 35 U.S.C. 154(b) by 1758 days.

(21) Appl. No.: 10/872,688

(22) Filed: Jun. 21, 2004

(65) Prior Publication Data
US 2006/0002551 A1    Jan. 5, 2006

(51) Int. Cl.
*H04N 7/16*  (2006.01)
*H04N 7/18*  (2006.01)

(52) U.S. Cl. .............. 725/31; 725/25; 725/86; 725/87

(58) Field of Classification Search ............ 725/25, 725/31, 86, 87
See application file for complete search history.

(56) References Cited

U.S. PATENT DOCUMENTS 6,889,385 B1 * 5/2005 Rakib et al. ............ 725/119
7,010,801 B1 * 3/2006 Jerding et al. ............ 725/95

* cited by examiner

*Primary Examiner*—Hunter B. Lonsberry
(74) *Attorney, Agent, or Firm*—Larry T. Cullen

(57) ABSTRACT

A method for controlling flow of a video content signal through a communications system, such as a video on-demand system creates a unique message for each individual video content signal and attaches the unique message to each individual video content signal prior to transmitting the video content signal through the communications system to a designed end user system. In one exemplary embodiment, the unique message comprises an in-band signaling message, such as a message inserted in a program map table in an MPEG packetized signal.

14 Claims, 4 Drawing Sheets

IN-BAND SIGNALING TO CONTROL ENCRYPTION AND TRANSCODING RESOURCES IN VOD/ON-DEMAND SYSTEM

FIELD OF THE INVENTION

The present invention relates generally to methods and apparatuses for communicating, and more particularly to a method and apparatus for communicating through a series of devices in a communications link.

BACKGROUND

Next generation Video On-Demand (VOD) systems will include the ability to optionally perform real-time encryption of content from a central or edge location, and the ability to optionally transcode the content. Transcoding is used to provide additional compression in order to reduce bandwidth. These systems consist of a network of devices, such as video servers (Seachange, N-Cube, etc.) that store and play out content, Central Encryptors (Motorola CE), Transcoders (Motorola TMX), and edge QAM devices (Motorola SEM or Harmonic NSG). Since these new features (central real-time encryption and trancoding) are optional (i.e., content specific), and human operators cannot be involved in decision-making each time a subscriber orders a VOD event, a method is needed to automate control of the VOD system. This automation is needed to direct the content through the VOD system to the Set-Top Box (STB) that initially requested the content, and to ensure that the proper processing is applied to the content along the way.

Thus, the present invention is therefore directed to the problem of developing an automated method for directing content through a series of devices in a communications system, such as a video-on-demand system to a set-top box.

SUMMARY OF THE INVENTION

The present invention solves these and other problems by providing a method for in-band signaling to automate control of the VOD system, which in-band signaling indicates to recipient devices of the signal certain operations to be performed by the recipient device on the signal itself.

According to one aspect of the present invention, an exemplary embodiment of the method for in-band signaling embeds a message in the signal, which message is processed by each recipient of the signal, and which embedded message indicates the types of operations to be performed on the signal, as well as potentially a next address of a next recipient of the signal.

According to another aspect of the present invention, an exemplary embodiment of a method for controlling flow of a video content signal through a communications system includes creating a unique message for each individual video content signal and attaching the unique message to said each individual video content signal prior to transmitting the video content signal through the communications system to a designed end user system.

DETAILED DESCRIPTION

Figure 1:
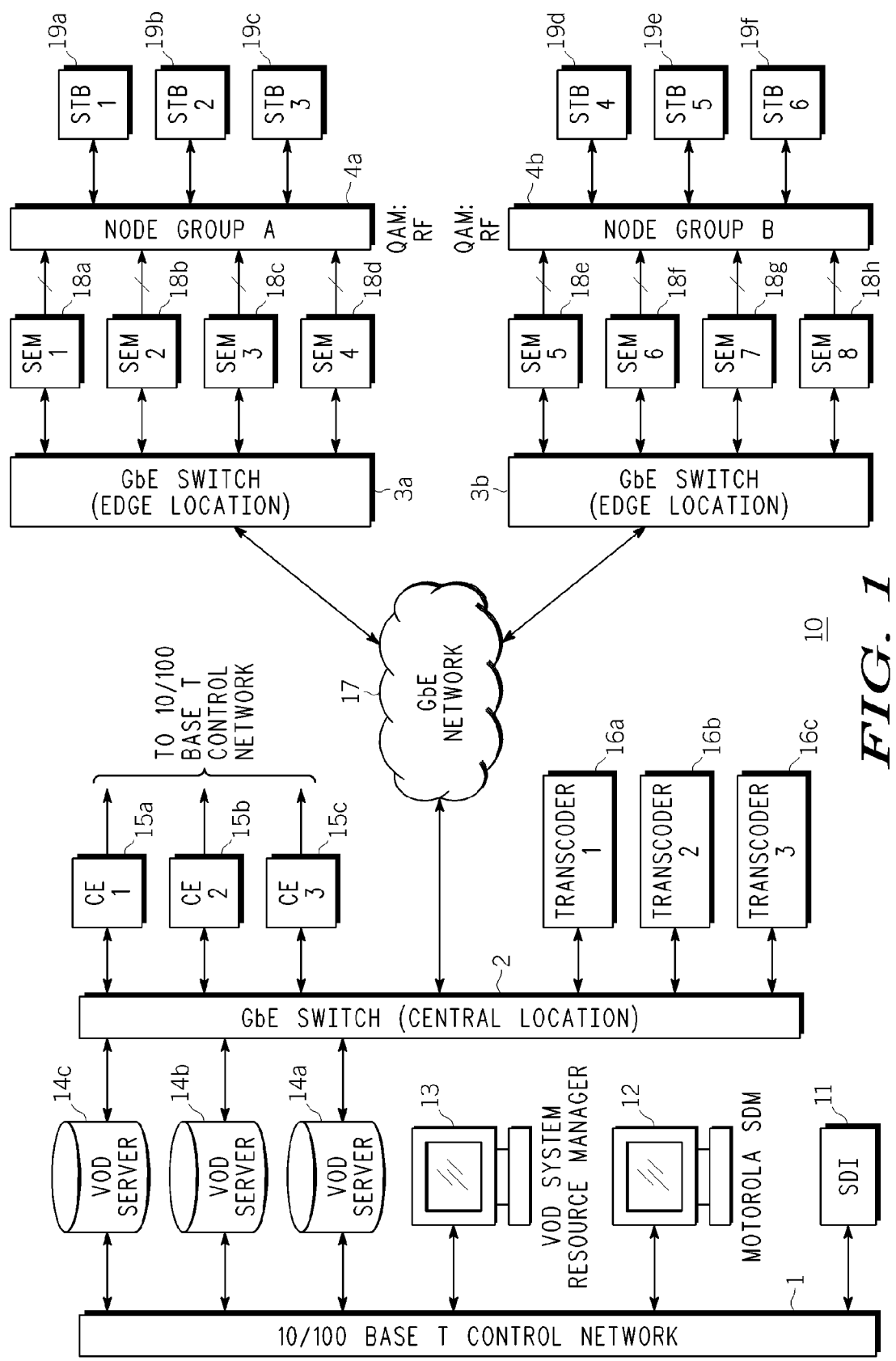
FIG. 1 depicts an exemplary embodiment of a system operating in accordance with certain aspects of the present invention.

It is worthy to note that any reference herein to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

The present invention provides a method to automate control of a communications system, such as a VOD system, such that content can be directed through a chain of devices in the communications system to the proper end user (e.g., a set top box), and to ensure that the proper processing (e.g., encryption/transcoding) is applied to the content along the way.

One exemplary embodiment of a method for providing this automation employs in-band signaling to indicate to the recipient devices what operations are to be performed on the content. According to the exemplary embodiment, a unique in-band signaling message is created for each individual piece of content before the content is played out, and this unique in-band signaling message accompanies the individual content through the chain of devices that make up the VOD system. This message provides instructions for each device indicating if features like encryption and transcoding (or compression) are required for the associated content. This embodiment also allows each device in the chain to determine the next device where the content should be sent (i.e., the next destination).

According to one exemplary embodiment of the above method, the unique in-band signaling message can be inserted into the PMT PID stream, and may contain the following information:

1. STB Unit Address (allows encrypting device to request specific encryption information so that the content can be encrypted in a way that only the requesting STB can decrypt)
2. Encryption Flag (yes/no)
3. Digital Rights Management/Conditional Copyright Information (DRM/CCI).
4. If encrypt=yes, IP address and Destination. User Datagram Port (UDP) port of Central Encryptor (CE).
5. Transcode Flag (yes/no)
6. If transcode=yes, IP address and Dest. UDP port of transcoder
7. Destination IP address of edge Quadrature Amplitude Modulation (QAM) device
8. Destination UDP port number to use when transmitting to edge QAM.

The advantage of this exemplary embodiment is that the in-band signaling message accompanies the content through the chain of devices in the system (VOD network). This allows each device in the chain to use the information in this message to determine the processing that is required, and the next device in the chain where it should send the content. No communication with external devices is required.

Without this method, a system controller would be required to uniquely provision each CE and or Transcoding device each time a VOD event was requested. This would also require an interface (XML or other) between the controller and the CE/Transcoder device. These interfaces require significant development, integration, and testing, and the extra communication with external devices requires time, which can make VOD session setup time longer. The in-band signaling interface eliminates the need for an external controller, complex interfaces between devices, and any real-time communication between devices while configuring the VOD network to support a requested VOD session.

The in-band signaling message accompanies the content through the network to allow the devices in the network to determine how they should process the content and where they should send it when they are done with it. The VOD system is responsible for initially creating the message and inserting the in-band signaling message into the content. The message is created based on STB ID, requested content, and available system resources (encryption/transcoding). The other devices in the network (CE's, transcoders, and edge QAM devices) are users of the information in the message.

The present invention describes an in-band signaling method that can be used to control encryption and transcoding resources in VOD/On-Demand systems.

Next generation VOD/on-demand systems will include the capability to optionally perform real-time encryption of content from either a central or edge location, and the capability to optionally transcode content as needed. Transcoding devices are used to provide additional compression of content in order to reduce bandwidth as needed.

These VOD/on-demand systems consist of a complex network of interconnected devices from different vendors. The VOD network devices include video servers that store and play out content, central encryptors (CE), transcoders, and edge QAM devices (such as Motorola SEM, and Harmonic NSG).

An exemplary embodiment 10 of a system to which the present invention is applicable is shown in FIG. 1. Several Video on-Demand Servers 14a-c are coupled to a 10/100 BaseT control network 1, to which is also coupled a VOD System Resource Manager 13, a Motorola SDM 12 and an SDI 11. The VOD servers 14a-c are coupled to a Gigabit Ether Network 17 via GBE Switch 2 located in a central location, as well as to central encryptors 15a-c and transcoders 16a-c, which are in turn coupled to the GBE Network 17 via the same GBE switch 2. On the other side of the GBE Network 17, there is a first GBE switch 3a (located at a first edge location), to which is coupled a first group of SEMs1-4 (18a-d). This first group of SEMS 1-4 18a-d is coupled to QAM 4a, which in turn is coupled to the set-top boxes 19a-c. The QAM 4a creates Node Group A. Similarly, also on the other side of the GBE Network 17, there is a second GBE switch 3b (located at a second edge location), to which is coupled a second group of SEMs5-8 (18e-h). This second group of SEMS5-8 18e-h is coupled to QAM 4b, which in turn is coupled to the set-top boxes 19d-f. The QAM 4b creates Node Group B. While specific numbers of devices are shown, these are merely exemplary, and any number of devices (e.g., central encrpytors, SEMS, transcoders, QAMs, STBs, etc.) could be employed without departing from the scope of the present invention.

As shown in FIG. 1, the system 10 includes several CE's 15a-c and several transcoder devices 16a-c in the central location. The CE's 15a-c are available to perform encryption of content that requires access control, and the transcoders 16a-c are available to perform content compression. In some systems, all content may pass through an available transcoder to minimize bandwidth. Other systems may only use transcoders as needed when usage becomes high and compression is needed to allow additional content to be "squeezed" into existing SEM QAM output transport streams that are reaching capacity.

In a system where some content requires encryption (access control) and other content can be distributed in the clear, and transcoding is only used as needed, a method is needed to ensure that the content associated with each VOD session receives the required processing before being delivered to the requesting STB. If a particular VOD session requires encryption, it must be routed through a CE before it can be delivered to the requesting STB. If that same VOD session also requires transcoding, then the content must also be routed through a transcoder device before delivery to the STB. If encryption and transcoding are not required, then the content does not need to be routed through any CE or transcoding devices. As a result, decision-making is required in the system each time a new VOD session is requested.

Based on the access control requirements of the requested content, and the current loading of the system, the system must determine if the content must be routed through a CE and or a transcoding device. It is typically the VOD system resource manager that would be responsible for making these decisions each time a new VOD session is requested. Note that the VOD system resource manager must also select an edge QAM device in an edge location to receive the content after all necessary encryption and transcoding is performed (in the central location). The selection of an edge QAM device is based on the location of the STB that initially requested the VOD session. This decision-making can be made by tracking the usage of the available resources in the CE and transcoding devices, along with knowledge of the topology of the VOD network. Network topology may be provided by the Motorola SDM product 12.

As described above, content processing (central real-time encryption and or transcoding) is optional (content specific). In addition, human operators cannot be involved in decision making each time a subscriber orders a VOD event. As a result, a method is needed to automate the command and control of the VOD system. This automation is needed to direct the content through the VOD network to the STB that initially requested the content, and to ensure that the proper processing is applied to the content along the way.

There are several ways that the command and control of the VOD system could be automated. One method would be to develop a new interface in all CE and transcoding devices to allow the VOD system resource manager (or other system controller) to individually provision each device each time a VOD session is requested. This would require real-time communication with each applicable device (CE and or Transcoder) each time a session was set up.

The disadvantage of the interface method is that it requires additional real-time communication between devices during each VOD session setup, which could be time consuming and error prone. In addition, it requires each CE and transcoding device to support an open interface, such that it can be controlled by 3rd party VOD system resource managers. Since this interface does not exist today, and it has not been standardized, development efforts would be required on the part of both Motorola, (CE and transcoding devices) and the VOD system resource managers to design and support the new interface. In the long term, this interface method may be desirable, but it may not be feasible in the short term because the VOD system vendors have expressed an unwillingness to develop a control interface in the near future.

The in-band signaling method of the present invention eliminates the need to develop control interfaces, yet still addresses the need to automate the control of the VOD system and ensure that the content associated with each VOD session receives the required processing as it travels through the VOD network.

Based on information received from a STB when a VOD event is initially requested, the VOD system resource manager (SRM) is able to determine the following information:
  STB Identification (STB Unit Address)
  STB Location (Node Group ID)
  Content Requested Using this information from the STB, the VOD SRM can make the following determinations:
  Subset of Edge QAM devices that have physical connectivity to the node group of the requesting STB (from topology information).
  Conditional Access and DRM/CCI requirements of the requested content.
  Whether or not transcoding is needed based on the loading of the available edge QAM devices.

The overall system design makes the following assumptions:
  The VOD SRM knows the topology of all devices and interconnections in the VOD system (network of VOD servers, CE's, transcoders, and edge QAM devices).
  The VOD system is aware of the current resource loading of all available edge QAM devices (possibly through the tracking of used resources as new VOD sessions are started and old sessions are deleted).
  The VOD system is aware of the current resource loading of all available CE's and transcoders (possibly through the tracking of used resources as new VOD sessions are started and old sessions are deleted).
  The VOD SRM follows the rule that if transcoding=yes and encryption=yes, always transcode first. This means that when both flags (encrypt and transcode) are yes, the SRM must transmit the content to the transcoder device specified in the in-band signaling message.

These assumptions, along with the information received from the STB during the initial session request, network topology information, and device resource loading information, allow the VOD SRM to determine the processing required for the requested content, and the path that the content should take through the VOD network. This path includes a certain CE (if encryption is required), a certain transcoding device (if transcoding is needed), and a certain edge QAM device.

In a potential long-term solution (see section 2.2), the VOD SRM could communicate individually over well-defined interfaces with the specific network devices that have been identified to be in the path of the requested content. This communication would involve the provisioning of the individual devices based on the assumptions and information described above. Alternatively, in-band signaling could be used to achieve the same goal.

When the in-band signaling method is used, a unique message is created for each individual piece of content before it is played out, and this message accompanies the content through the chain of devices that make up the VOD system. This message provides instructions for each device indicating if features like encryption, transcoding, and QAM_up-conversion are required for the associated content. The message would be inserted into the PMT PID stream, and would contain the following information:

1. STB Unit Address (allows encrypting device to request specific encryption information so that the content can be encrypted in a way that only the requesting STB can decrypt).
2. Flags to indicate required processing (transcoding, encryption, QAM_up-conversion)
3. DRM/CCI Info.
4. If encrypt=yes, IP address and Dest. UDP port of CE.
5. If transcode=yes, IP address and Dest. UDP port of transcoder.
6. If QAM_up-conversion=yes, IP address and Dest. UDP port of edge QAM device.

This method also allows each device in the chain to determine the next device where the content should be sent (next destination). The next device is determined by the order of processing listed in the in-band signaling message. If transcoding, encryption, and QAM_up-conversion are required, the VOD SRM would create the in-band message as shown below in Table 1 indicating that transcoding should be performed first, followed by encryption, and then finally QAM_up-conversion. The VOD SRM knows that transcoding is required first so it sends the content to the identified transcoder. The transcoder sees that the next device after transcoding is encryption so the transcoder sends to the content to the identified CE. The CE sees that the next device after encryption is QAM_up-conversion so the CE sends the content to the identified QAM edge device.

The advantage of this method is that the in-band signaling message accompanies the content through the chain of devices in the system (VOD network). This allows each device in the chain to use the information in this message to determine what processing it should do, and the next device in the chain where it should send the content (based on the processing order listed in the message). No communication with external devices is required. The in-band signaling method eliminates the need for an external controller, complex interfaces between devices, and any real-time communication between devices while configuring the VOD network to support a requested VOD session.

EXAMPLE

The in-band signaling message accompanies the content through the network to allow the devices in the network to determine how they should process the content and where they should send it when they are done with it. The VOD system is responsible for initially creating the message and inserting it into the content. The message is created based on STB ID, the requirements of the requested content, and available system resources (encryption, transcoding, and QAM_up-conversion). The other devices in the network (CE's, Transcoders, and edge QAM devices) are users of the information in the message.

Figure 2:
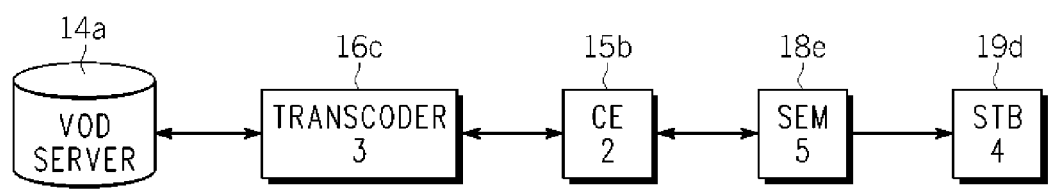
FIG. 2 depict a block diagram of an portion of the system of FIG. 1 according to another aspect of the present invention.
Figure 3:
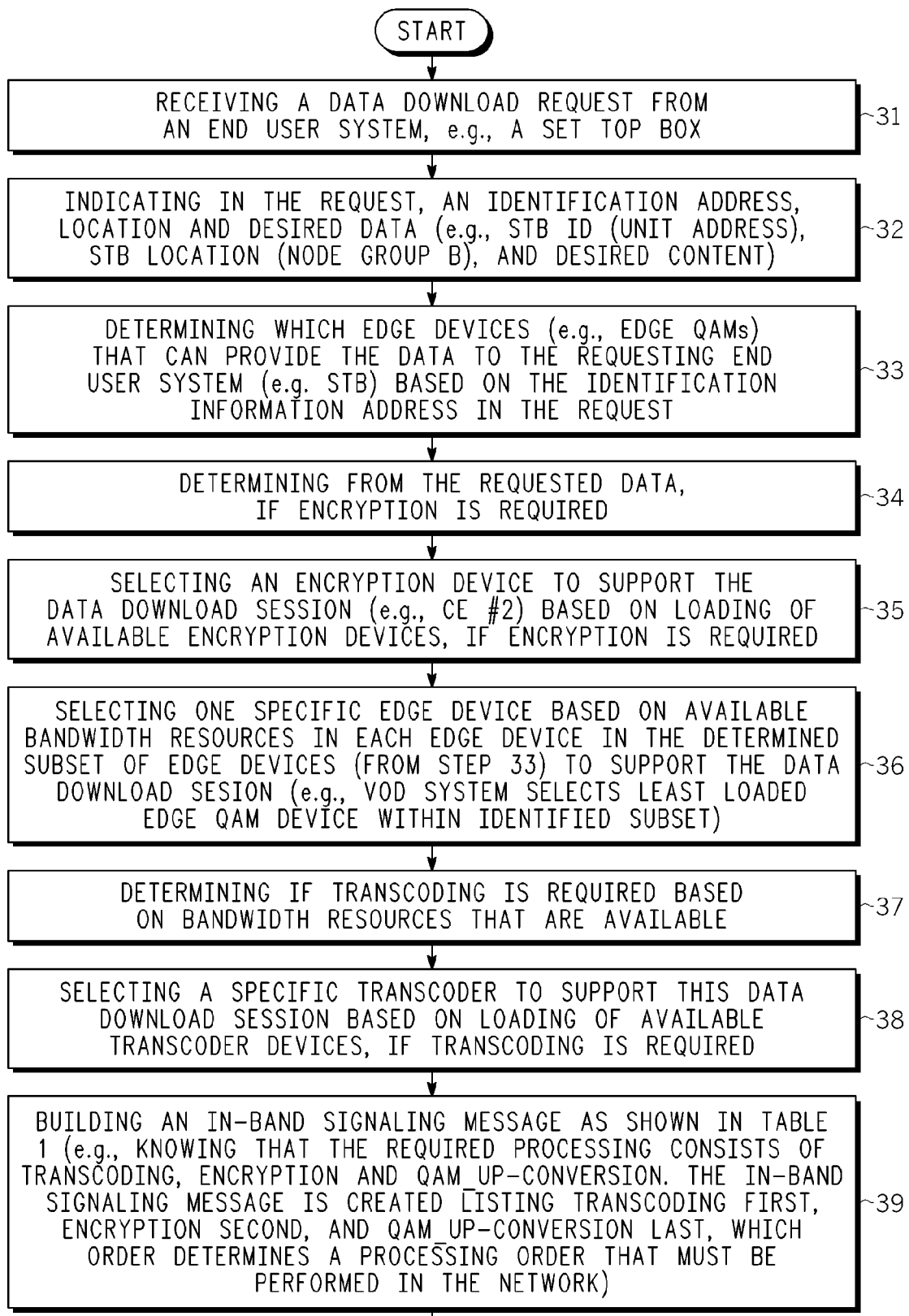
FIGS. 3-4 depict an exemplary embodiment of a method for controlling a video content signal path through a communications system according to still another aspect of the present invention.
Figure 4:
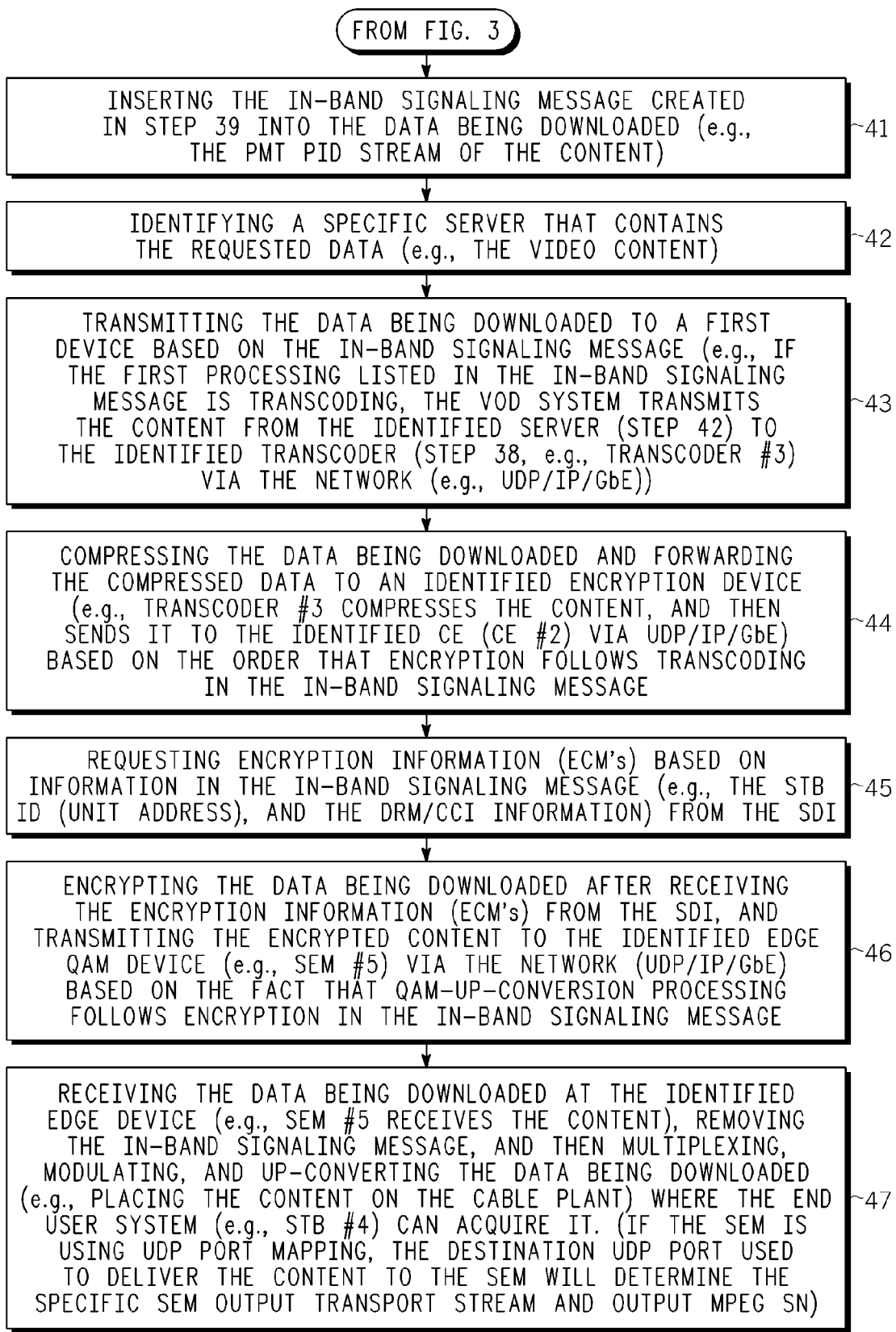

An exemplary embodiment 30 of a method for controlling a data download, such as a video on-demand session is described below with reference to FIGS. 3-4 assuming the configuration of FIG. 1. The end result of the path 20 that the download will follow in this example is shown in FIG. 2, which includes VOD server 14a, transcoder 16c, central encryptor 15b, SEM5 18e and STB4 19d.

In element 31, the process 30 is initiated when an end user system, such as a set-top box (e.g., STB #4, FIG. 1), requests a data download, such as a VOD event.

In element 32, the end user system indicates in the request an identification address (e.g., STB ID (unit address)), a location (e.g., STB location) and a desired data to be downloaded (e.g., a desired video content).

In element 33, it is determined which edge devices (e.g., a subset of edge QAM devices) can provide the requested data to the requesting end user system (e.g., STB) based on the identification information address in the request. For example, as shown in FIG. 1, SEM's 5, 6, 7 and 8 have physical connectivity to STB #4.

In element 34, it is determined from the requested content if encryption is needed or not. We shall assume in this example that encryption is required.

In element 35, as encryption is required, a specific encryption devices is selected (e.g., CE #2) to support the data download session based on the loading of the available encryption devices (loading information not shown).

In element 36, based on the available bandwidth resources in each edge device of the identified subset of edge devices in step 33 (e.g., the edge QAM devices), one specific edge device (e.g., an edge QAM device) is selected to support the data download session. The least loaded edge QAM device within the identified subset may be selected. In this example, we shall assume the VOD system selects SEM #5.

In element 37, it is determined if transcoding is needed based on the bandwidth resources that are available. In this example, we shall assume transcoding is needed.

In element 38, as transcoding is required, a specific transcoder is selected (e.g., the VOD system selects transcoder #3) to support the data download session based on the loading of the available transcoder devices (loading information not shown).

In element 39, the in-band signaling message is created as shown below in Table 1. Knowing that the required processing includes transcoding, encryption and QAM_up-conversion, the in-band signaling message is created listing transcoding first, encryption second, and QAM_up-conversion last. This order determines the order that the processing must be performed in the network.

In element 41, the in-band signaling message is inserted into the data being downloaded (e.g., into the PMT PID stream of the content).

In element 42, the specific server that contains the requested data (e.g., the video content) is identified.

In element 43, based on the order of processing listed in the in-band signaling message, which in this case is transcoding, the data being downloaded is transmitted from the identified server to the identified transcoder (e.g., transcoder #3) via the network (e.g., UDP/IP/GbE—Gigabyte Ethernet).

In element 44, the data being downloaded is compressed (as transcoding was required in this example) (e.g., transcoder #3 compresses the content), and then sends the compressed data to the identified encryption device (e.g., CE #2) via the network (e.g., UDP/IP/GbE). This occurs because in this example, encryption processing follows transcoding in the in-band signaling message.

In element 45, the encryption device requests encryption information (e.g., ECM's) based on the end user system address (e.g., STB ID (unit address), and the DRM/CCI information) contained in the in-band signaling message from the SDI.

In element 46, after receiving the encryption information (e.g., the ECM's) from the SDI, the encryption device encrypts the data being downloaded and then transmits the encrypted data to the identified edge device (e.g., edge QAM device, such as SEM #5) via the network (e.g., UDP/IP/GbE). This occurs because in this example, QAM-up-conversion processing follows encryption in the in-band signaling message.

In element 47, the identified edge device (e.g., SEM #5) receives the data being downloaded, removes the in-band signaling message, and then multiplexes, modulates, and up-converts the data being downloaded (e.g., places the content on the cable plant) where the end user system (e.g., STB #4) can acquire the data. For example, if the SEM is using UDP port mapping, the Destination UDP port used to deliver the content to the SEM will determine the specific SEM output transport stream and output MPEG SN.

Example In-Band Signaling Message

TABLE 1

| In-Band Signaling Message | |
|---|---|
| Parameter | Value |
| STB Unit Address | UA of STB #4 |
| Processing Flags | |
| reserved | |
| Transcoding | Transcode == yes |
| Encryption | Encryption == yes |
| QAM_up-convert | QAM_up-convert == yes |
| If transcode == yes | |
| IP address of transcoder | IP address of transcoder #3 |
| Destination UDP port number | Destination UDP port number |
| If encrypt == yes | |
| IP address of CE | IP address of CE #2 |
| Destination UDP port number | Destination UDP port number |
| DRM/CCI Information | Specific DRM/CCI information required by requested content |
| If QAM_up-convert == yes | |
| IP address of edge QAM device | IP address of SEM #5 |
| Destination UDP port number | Destination UDP port number |

Note: reserved bits under processing flags allow additional processing types to be added in the future (future expansion) if necessary.

Although various embodiments are specifically illustrated and described herein, it will be appreciated that modifications and variations of the invention are covered by the above teachings and are within the purview of the appended claims without departing from the spirit and intended scope of the invention. For example, certain video content is described, however, the present invention applies to any data being downloaded. Moreover, the system configuration shown in FIG. 1 is not the only system configuration to which the inventions herein are applicable, rather the inventions herein are applicable any communication system in which the path of the devices in the system can change based on the requested data and availability of system resources on a dynamic basis. Furthermore, these examples should not be interpreted to limit the modifications and variations of the invention covered by the claims but are merely illustrative of possible variations.

The invention claimed is:

1. A method for controlling flow of an individual video content signal through a communications system comprising:
    creating a unique message for the individual video content signal; and
    attaching the unique message to the individual video content signal prior to transmitting the individual video content signal through the communications system to a designated end user system, wherein the unique message identifies whether the individual video content signal is routed to each of one or more optional devices that, when identified to do so, are to operate on the video content prior to transmitting the individual video content, wherein the unique message further identifies an order in which the individual content is to be operated upon by two or more of the one or more optional devices, when two or more optional devices are identified for the content signal to be routed to.

2. A method for controlling flow of a video content signal through a communications system comprising:

creating a unique message for each individual video content signal before the individual video content signal is sent to an end user system; and sending the unique message in association with the individual video content signal through a chain of devices that make up the communications system, wherein the unique message provides instructions for one or more devices in the chain of devices indicating whether or not a respective optional operation is required to be performed on the associated video content signal by each of the one or more devices, and wherein the unique message further identifies an order in which the individual content is to be operated upon by two or more of the one or more optional devices, when two or more optional devices are identified for the content signal to be routed to.

3. The method according to claim 2, wherein said one or more optional operations include one or more of the following: encryption, transcoding and QAM upconversion.

4. The method according to claim 2, further comprising inserting the unique message into a PMT PID stream.

5. The method according to claim 4, wherein the unique message includes one or more of the following:

one or more flags to indicate optional operations;

DRM/CCI Information;

If encrypt=yes, IP address and destination UDP port of end user system;

If transcode=yes, IP address and destination UDP port of transcoder;

If QAM_up-conversion =yes, IP address and destination UDP port of edge QAM device; and a next device to which the video content signal should be sent.

6. The method according to claim 1, wherein the data is a desired data download, and wherein the one or more optional devices comprise a transcoding device that compresses the desired data download and encryption device that encrypts the desired data download.

7. The method according to claim 6, further comprising:

receiving a request for the desired data download from an end user system; and indicating in the request at least an end user identification and a desired data download.

8. The method according to claim 6, further comprising:

identifying a specific server that has the desired data download; and transmitting the desired data download from the specific server to the transcodinq device prior to the encryption device when both compression and encryption of the data are required.

9. The method according to claim 6, further comprising:

encrypting the desired data download, when encryption is required

10. The method according to claim 6, further comprising:

requesting encryption information when encryption is required;

receiving the encryption information associated with the end user system, and encrypting the desired data download.

11. The method according to claim 6, further comprising:

receiving the desired data download at an edge device; and removing the in-band signaling message from the desired data download.

12. The method according to claim 11, further comprising:

multiplexing, modulating and up-converting the desired data download for subsequent access by the end user system.

13. The method according to claim 6, further comprising:

inserting the in-band signaling message into a program message table of an MPEG packet.

14. An apparatus for controlling flow of individual video content through a communications system to an end user system, comprising:

a resource manager that generates a unique in-band signaling message for the individual video content before the individual video content is transmitted through the communications system, wherein the unique in-band signaling message identifies whether the individual video content is routed to each of one or more optional devices that, when identified to do so, are to operate on the video content prior to transmitting the individual video content, wherein the unique in-band signaling message further identifies an order in which the individual content is to be operated upon by two or more of the one or more optional devices, when two or more optional devices are identified for the content signal to be routed to;

a server to store the requested data and forward the requested data to the end user system along with the attached in-band signaling message.

* * * * *